United States Patent
Lutter et al.

(10) Patent No.: US 10,723,828 B2
(45) Date of Patent: Jul. 28, 2020

(54) TACK-FREE POLYURETHANE FLEXIBLE FOAM

(71) Applicant: BASF SE, Ludwigshafen am Rhein (DE)

(72) Inventors: Heinz-Dieter Lutter, Lemfoerde (DE); Manuela Faehmel, Lemfoerde (DE); Kirsten Simon, Lemfoerde (DE); Claudio Petrini, Villanova d'Asti AT (IT)

(73) Assignee: BASF SE, Ludwigshafen am Rhein (DE)

( * ) Notice: Subject to any disclaimer, the term of this patent is extended or adjusted under 35 U.S.C. 154(b) by 79 days.

(21) Appl. No.: 16/300,670

(22) PCT Filed: May 2, 2017

(86) PCT No.: PCT/EP2017/060324
§ 371 (c)(1),
(2) Date: Nov. 12, 2018

(87) PCT Pub. No.: WO2017/194340
PCT Pub. Date: Nov. 16, 2017

(65) Prior Publication Data
US 2019/0177463 A1    Jun. 13, 2019

(30) Foreign Application Priority Data

May 12, 2016 (EP) .................................... 16169387

(51) Int. Cl.
| | | |
|---|---|---|
| *C08G 18/12* | (2006.01) | |
| *C08G 18/76* | (2006.01) | |
| *C08G 18/48* | (2006.01) | |
| *C08G 18/18* | (2006.01) | |
| *C08G 18/20* | (2006.01) | |
| *C08G 101/00* | (2006.01) | |
| *C08G 18/08* | (2006.01) | |

(52) U.S. Cl.
CPC .......... *C08G 18/12* (2013.01); *C08G 18/1833* (2013.01); *C08G 18/2027* (2013.01); *C08G 18/4804* (2013.01); *C08G 18/485* (2013.01); *C08G 18/4808* (2013.01); *C08G 18/4816* (2013.01); *C08G 18/7657* (2013.01); *C08G 18/7664* (2013.01); *C08G 18/7671* (2013.01); *C08G 18/089* (2013.01); *C08G 2101/005* (2013.01); *C08G 2101/0008* (2013.01); *C08G 2101/0083* (2013.01); *C08J 2205/06* (2013.01)

(58) Field of Classification Search
CPC ........... C08G 18/4804; C08G 18/4808; C08G 18/7657; C08G 18/7671; C08G 18/4837
See application file for complete search history.

(56) References Cited

U.S. PATENT DOCUMENTS

| | | | |
|---|---|---|---|
| 3,304,273 A | 2/1967 | Stamberger et al. | |
| 3,383,351 A | 5/1968 | Stamberger et al. | |
| 3,523,093 A | 8/1970 | Stamberger et al. | |
| 6,617,369 B2 * | 9/2003 | Parfondry ........ | C08G 18/4804 521/130 |
| 2015/0336306 A1 * | 11/2015 | Hahn ................ | B32B 7/02 428/217 |
| 2016/0115387 A1 * | 4/2016 | Vandevelde ....... | C08G 18/1833 71/24 |

FOREIGN PATENT DOCUMENTS

| | | |
|---|---|---|
| DE | 111394 C | 7/1899 |
| DE | 1152536 B | 8/1963 |
| DE | 1152537 B | 8/1963 |
| DE | 10105559 A1 | 8/2002 |
| DE | 102004047406 A1 | 3/2006 |
| EP | 250351 A2 | 12/1987 |
| WO | WO-2017194341 A1 | 11/2017 |

OTHER PUBLICATIONS

European Search Report for EP Patent Application No. 16169387.4, dated Oct. 28, 2016, 3 pages.
International Search Report for International Application No. PCT/EP2017/060324, dated Jul. 24, 2017, 3 pages.

* cited by examiner

*Primary Examiner* — Marc S Zimmer
(74) *Attorney, Agent, or Firm* — Armstrong Teasdale LLP

(57) ABSTRACT

Described herein is a process for producing flexible polyurethane foams, in which (a) polyisocyanate prepolymer, is mixed with (b) polymeric compounds having groups reactive toward isocyanates, (c) optionally chain extenders and/or crosslinkers, (d) catalyst, (e) blowing agent comprising water and (f) optionally additives to give a reaction mixture and reacted to give a flexible polyurethane foam.

11 Claims, No Drawings

TACK-FREE POLYURETHANE FLEXIBLE FOAM

CROSS-REFERENCE TO RELATED APPLICATIONS

This application is a U.S. National Phase Application of PCT/EP2017/060324, filed May 2, 2017, which claims the benefit of priority to European Patent Application No. 16169387.4, filed May 12, 2016, the entire contents of which are hereby incorporated by reference herein.

The present invention relates to processes for producing flexible polyurethane foams, in which (a) polyisocyanate prepolymer is mixed with (b) polymeric compounds having groups reactive toward isocyanates, (c) optionally chain extenders and/or crosslinkers, (d) catalyst, (e) blowing agent comprising water and (f) optionally additives to give a reaction mixture and reacted to give the flexible polyurethane foam, wherein the polyisocyanate prepolymers (a) have an NCO content of from 16 to 30% by weight, based on the total weight of the component a), and are obtainable by reacting (a1) diphenylmethane diisocyanate comprising (a1a) diphenylmethane 2,4'-diisocyanate, (a1b) diphenylmethane 4,4'-diisocyanate and (a1c) higher homologues of diphenylmethane diisocyanate having more than two rings with (a2) polyols comprising (a2a) ethylene-oxide-rich polyalkylene oxide having a hydroxyl number of from 20 to 60 mg KOH/g derived from one or more bifunctional to tetrafunctional starter molecules and a proportion of ethylene oxide units, based on the total weight of alkylene oxide units, of at least 55 (65, 70)% by weight and (a2b) low-ethylene oxide polyalkylene oxide having a hydroxyl number of from 20 to 60 mg KOH/g derived from one or more bifunctional to tetrafunctional starter molecules and a proportion of ethylene oxide units, based on the total weight of alkylene oxide units, of not more than 20% by weight, and the proportion of (a1a) diphenylmethane 2,4'-diisocyanate is from 5 to 15% by weight and that of (a1 b) diphenylmethane 4,4'-diisocyanate is from 40 to 80% by weight, based on the total weight of the polyisocyanates (a1), and the polymeric compounds (b) having groups which are reactive toward isocyanates comprise (b1) from 60 to 80% by weight of at least one polyalkylene oxide having a hydroxyl number of from 20 to 60 mg KOH/g derived from one or more bifunctional to tetrafunctional starter molecules and a proportion of ethylene oxide units, based on the total weight of alkylene oxide units, of from at least 55 to 95% by weight, (b2) from 20 to 30% by weight of at least one polyalkylene oxide having a hydroxyl number of from 20 to 80 mgKOH/g derived from one or more bifunctional to tetrafunctional starter molecules and a proportion of ethylene oxide units, based on the total weight of alkylene oxide units, of from 0 to 40% by weight and the proportion of the compounds (b1) and (b2), based on the total weight of the polymeric compounds (b) having groups which are reactive toward isocyanates, is at least 80% by weight. The present invention further relates to a nonsticky flexible polyurethane foam obtainable by such a process.

Flexible polyurethane foams are known and are used for producing mattresses, upholstery in furniture such as chairs, sofas and armchairs and also in the automobile sector, for example in the production of automobile seats. A further important possible use of flexible polyurethane foams is the production of cushions. This is usually carried out in a mold, with the starting materials for producing the flexible polyurethane foam being mixed and placed in a mold. A flexible foam whose surface is covered by an essentially noncellular polyurethane skin is obtained in this way.

A problem associated with known flexible polyurethane foams, in particular with molded flexible polyurethane foams, is that the surface thereof is often sticky. This phenomenon occurs particularly in the case of particularly soft polyurethane foams having indentation hardnesses in accordance with DIN EN ISO 2439, method A, of less than 70N and at an isocyanate index of less than 100 and leads to disadvantages in consumer acceptance and occupational hygiene.

DE 10105559 discloses low-density hydrophilic flexible polyurethane foams which are derived from at least one polyol of an at least bifunctional polyol on the basis of propylene oxide having an EO content of greater than 40% by weight, based on the total amount of alkylene oxide used, and have a content of primary OH groups of greater than 20% and an OH number of 20-120 mg KOH/g and at least one further polyol on the basis of propylene oxide and optionally ethylene oxide having a functionality of at least 2 and an EO content of not more than 40% by weight and having an OH number of greater than 25 mg KOH/g. As isocyanates, preference is given to using TDI and/or mixtures of MDI having a proportion of 2,4"-MDI isomer of more than 30% by weight. The foams obtainable according to DE 10105559 are sticky.

It was an object of the present invention to provide nonsticky flexible polyurethane foams, preferably molded foams, in particular ones having indentation hardnesses in accordance with DIN EN ISO 2439, method A, of less than 70N.

The object of the present invention has surprisingly been able to be achieved by processes for producing flexible polyurethane foams, in which (a) polyisocyanate prepolymer is mixed with (b) polymeric compounds having groups reactive toward isocyanates, (c) optionally chain extenders and/or crosslinkers, (d) catalyst, (e) blowing agent comprising water and (f) optionally additives to give a reaction mixture and reacted to give the flexible polyurethane foam, wherein the polyisocyanate prepolymers (a) have an NCO content of from 16 to 30% by weight, based on the total weight of the component a), and are obtainable by reacting (a1) diphenylmethane diisocyanate comprising (a1a) diphenylmethane 2,4'-diisocyanate, (a1 b) diphenylmethane 4,4'-diisocyanate and (a1c) higher homologues of diphenylmethane diisocyanate having more than two rings with (a2) polyols comprising (a2a) ethylene-oxide-rich polyalkylene oxide having a hydroxyl number of from 20 to 60 mg KOH/g derived from one or more bifunctional to tetrafunctional starter molecules and a proportion of ethylene oxide units, based on the total weight of alkylene oxide units, of at least 55% by weight and (a2b) low-ethylene oxide polyalkylene oxide having a hydroxyl number of from 20 to 60 mg KOH/g derived from one or more bifunctional to tetrafunctional starter molecules and a proportion of ethylene oxide units, based on the total weight of alkylene oxide units, of not more than 10% by weight, and the proportion of (a1a) diphenylmethane 2,4'-diisocyanate is from 5 to 15% by weight and that of (a1 b) diphenylmethane 4,4'-diisocyanate is from 40 to 80% by weight, based on the total weight of the polyisocyanates (a1), and the polymeric compounds (b) having groups which are reactive toward isocyanates comprise (b1) from 60 to 80% by weight of at least one polyalkylene oxide having a hydroxyl number of from 20 to 60 mg KOH/g derived from one or more bifunctional to tetrafunctional starter molecules and a proportion of ethylene oxide units, based on the total weight of alkylene oxide units, of from at least 55 to 95% by weight, (b2) from 20 to 30% by weight of at least one polyalkylene oxide having a hydroxyl number of from 20 to 80 mg KOH/g derived from one or more bifunctional to tetrafunctional starter molecules and a proportion of ethylene oxide units, based on the total weight of alkylene oxide units, of from 0 to 40% by weight and the proportion of the compounds (b1) and (b2), based on the total weight of the polymeric compounds (b) having groups which are reactive toward isocyanates, is at least 80% by weight. The present invention further provides a nonsticky flexible polyurethane foam obtainable by such a process.

A flexible polyurethane foam according to the invention is a polyurethane foam having a density of less than 100 g/l, preferably from 20 to 70 g/l, particularly preferably from 30 to 60 g/l and in particular from 40 to 55 g/l. The nonsticky polyurethane foams according to the present invention also preferably have an indentation hardness in accordance with DIN EN ISO 2439, method A, of less than 100N, particularly preferably less than 80N, more preferably less than 70N and in particular less than 60N. The compression set, measured at 70° C., 50% compression over 22 hours in accordance with DIN EN ISO 1856, is preferably less than 20%, particularly preferably less than 15%, more preferably less than 10% and in particular less than 5%.

The compression set of a flexible polyurethane foam according to the invention after 22 hours of compression by 90% at 70° C. using a method based on DIN EN ISO 1856 is preferably less than 20%, particularly preferably less than 10% and in particular less than 5%.

In a preferred embodiment, the flexible polyurethane foam according to the invention is a viscoelastic flexible polyurethane foam. Viscoelastic flexible polyurethane foams display an absolute maximum value of the loss modulus tan delta in the temperature range from −10 to 40° C., preferably from 0 to 35° C., particularly preferably from 10 to 35 and in particular from 15 to 30° C. Here, the absolute maximum value of the loss modulus tan delta corresponds to the glass transition temperature in accordance with ASTM D 4065-99. Furthermore, the viscoelastic polyurethane foams according to the invention have a rebound resilience in accordance with DIN EN ISO 8307 of less than 20% and also a high damping behavior which is expressed by a value for tan delta at 20° C. of at least 0.2, preferably at least 0.4 and particularly preferably at least 0.5. Here, the tan delta is determined by means of dynamic mechanical analysis (DMA) at a frequency of 1 Hz and in a temperature range from −80 to +200° C. at a deformation of 0.3% using a method based on DIN EN ISO 6721-1, DIN EN ISO 6721-2, DIN EN ISO 6721-7. The temperature program is carried out in 5° C. steps.

As polyisocyanate prepolymers (a), use is made of prepolymers which have an NCO content of from 16 to 30% by weight, based on the total weight of the component a), and are obtainable by reacting (a1) diphenylmethane diisocyanate comprising (a1a) diphenylmethane 2,4'-diisocyanate, (a1 b) diphenylmethane 4,4'-diisocyanate and (a1c) higher homologues of diphenylmethane diisocyanate having more than two rings with (a2) polyols.

Here, the proportion of (a1a) diphenylmethane 2,4'-diisocyanate is from 5 to 15% by weight and that of (a1 b) diphenylmethane 4,4'-diisocyanate is from 40 to 80% by weight, in each case based on the total weight of the polyisocyanates (a1). In a preferred embodiment, the proportion of higher homologues of diphenylmethane diisocyanate having more than two rings (a1c) is from 3 to 30% by weight, preferably from 5 to 25% by weight. To prepare the polyisocyanate prepolymers, preference is given to using less than 20% by weight, and particularly preferably less than 10% by weight, more preferably less than 1% by weight of further isocyanates and in particular no further isocyanates other than the isocyanates (a1a), (a1 b) and (a1c) for preparing the prepolymer (a). Further isocyanates comprise all isocyanates customary in polyurethane chemistry with the exception of the isocyanates (a1a), (a1b) and (a1c), for example aliphatic isocyanates, further aromatic isocyanates or modified isocyanates such as isocyanates which are formed by incorporation of groups derived from isocyanate groups in the polyisocyanates. Examples of such groups are allophanate, carbodiimide, uretonimine, isocyanurate, urea and biuret groups.

The isocyanates (a1) are reacted with polyols (a2) to give the isocyanate prepolymer. Here, the polyols (a2) comprise ethylene oxide-rich polyalkylene oxide (a2a) having a hydroxyl number of from 20 to 60 mg KOH/g derived from one or more bifunctional to tetrafunctional starter molecules and a proportion of ethylene oxide units, based on the total weight of alkylene oxide units, of at least 55% by weight, preferably at least 65% by weight and particularly preferably at least 75% by weight, and low-ethylene oxide polyalkylene oxide (a2b) having a hydroxyl number of from 20 to 60 mg KOH/g derived from one or more bifunctional to tetrafunctional starter molecules and a proportion of ethylene oxide units, based on the total weight of alkylene oxide units, of not more than 20, preferably not more than 10, particularly preferably not more than 5 and in particular 0% by weight. The maximum proportion of ethylene oxide units in the polyol (a2a), based on the total weight of alkylene oxide units in the polyol (a2a), preferably less than 90% by weight, particularly preferably less than 85% by weight and in particular less than 80% by weight. In a particularly preferred embodiment, the proportion of ethylene oxide units in the polyol (a2a), based on the total weight of alkylene oxide units in the polyol (a2a), is from 65 to 90% by weight.

The polyol (a2b) preferably comprises from 2 to 20% by weight, particularly preferably from 5 to 15% by weight, of ethylene oxide units, based on the total weight of alkylene oxide units in the polyol (a2b).

Preference is given to the proportion of ethylene oxide-rich polyalkylene oxide (a2a) being from 4 to 8% by weight and the proportion of low-ethylene oxide polyalkylene oxide (a2b) being from 10 to 16% by weight, in each case based on the total weight of the isocyanate prepolymer a).

In a further preferred embodiment, the polyalkylene oxide (a2a) has a proportion of primary OH groups of from 60 to 100%, particularly preferably from 70 to 90% and in particular from 70 to 80%, based on the total number of OH groups of the polyalkylene oxide (a2a), and the polyalkylene oxide (a2b) has a proportion of primary OH groups of from 30 to 0%, particularly preferably from 20 to 0% and in particular from 10 to 0%, based on the total number of OH groups of the polyalkylene oxide (a2b).

The polyols (a2) preferably comprise less than 20% by weight, preferably less than 10% by weight, of further polyols, based on the total weight of the polyols (a2) in addition to the above-described polyols (a2a) and (a2b). In particular, the polyols comprise no further polyols in addition to the polyols (a2a) and (a2a). Further polyols comprise all customary polyols used in polyurethane chemistry. These comprise the polymeric compounds having groups which are reactive toward isocyanates as described under (b) and also the chain extenders and crosslinkers described under (c). Preference is given to using no chain extenders and/or crosslinkers for preparing the isocyanate prepolymers (a).

The polyols (a2) are generally known and are commercially available. The preparation thereof is described in the description of the polyols b). As starter molecules, it is possible to use all known starters which are described under (b) and have the appropriate functionality. Preference is given to using bifunctional and trifunctional starters such as ethylene glycol, water, glycerol or trimethylolpropane as starters.

To prepare the isocyanate prepolymer (a), the starting materials diphenylmethane diisocyanate (a1) and polyol (a2) are mixed. This occurs in such a ratio that the NCO content of the prepolymer is from 16 to 30% by weight, preferably from 20 to 28% by weight. The mixture is preferably heated to temperatures of from 30 to 100° C., preferably about 80° C.

Suitable polymeric compounds (b) having groups which are reactive toward isocyanate are preferably polyether alcohols having a functionality of from 2 to 8, preferably from 2 to 6, particularly preferably from 2 to 4, and an average equivalent molecular weight in the range from 400 to 8000 g/mol, preferably from 1000 to 5000 g/mol and particularly preferably from 3000 to 4000 g/mol. In particular, exclusively polyether alcohols are used as polymeric compounds (b) having groups which are reactive toward isocyanate. The polyether alcohols can be prepared by known methods, usually by catalytic addition of alkylene oxides, in particular ethylene oxide and/or propylene oxide, onto H-functional starter substances or by condensation of tetrahydrofuran. When alkylene oxides are added on, the term polyalkylene oxide polyols is also used. H-functional starter substances used are, in particular, polyfunctional alcohols and/or amines. Preference is given to using water, dihydric alcohols, for example ethylene glycol, propylene glycol or butanediols, trihydric alcohols, for example glycerol or trimethylolpropane, and also higher-hydric alcohols such as pentaerythritol, sugar alcohols, for example, sucrose, glucose or sorbitol. Amines which are preferably used are aliphatic amines having up to 10 carbon atoms, for example ethylenediamine, diethylenetriamine, propylenediamine, and also amino alcohols such as ethanolamine or diethanolamine. As alkylene oxides, preference is given to using ethylene oxide and/or propylene oxide, with an ethylene oxide block frequently being added on at the end of the chain in the case of polyether alcohols which are used for producing flexible polyurethane foams. Basic compounds, in particular, are used as catalysts in the addition reaction of the alkylene oxides, with potassium hydroxide having the greatest industrial importance here. When the content of unsaturated constituents in the polyether alcohols is intended to be low, dimetal or multimetal cyanide compounds, known as DMC catalysts, can also be used as catalysts. To produce highly elastic flexible polyurethane foams, use is made in particular of bifunctional and/or trifunctional polyalkylene oxide polyols.

Furthermore, polyester polyols, which can for example be prepared from organic dicarboxylic acids having from 2 to 12 carbon atoms, preferably aliphatic dicarboxylic acids having from 8 to 12 carbon atoms, and polyhydric alcohols, preferably diols, having from 2 to 12 carbon atoms, preferably from 2 to 6 carbon atoms, can be used as compound having at least two active hydrogen atoms. Possible dicarboxylic acids are, for example: succinic acid, glutaric acid, adipic acid, suberic acid, azelaic acid, sebacic acid, decanedicarboxylic acid, maleic acid, fumaric acid, phthalic acid, isophthalic acid, terephthalic acid and the isomeric naphthalene dicarboxylic acids. Preference is given to using adipic acid. The dicarboxylic acids can be used either individually or in admixture with one another. The corresponding dicarboxylic acid derivatives such as dicarboxylic esters of alcohols having from 1 to 4 carbon atoms or dicarboxylic anhydrides can also be used instead of the free dicarboxylic acids.

Examples of dihydric and polyhydric alcohols, in particular diols, are: ethanediol, diethylene glycol, 1,2- or 1,3-propanediol, dipropylene glycol, 1,4-butanediol, 1,5-pentanediol, 1,6-hexanediol, 1,10-decanediol, glycerol and trimethylolpropane. Preference is given to using ethanediol, diethylene glycol, 1,4-butanediol, 1,5-pentanediol, 1,6-hexanediol or mixtures of at least two of the diols mentioned, in particular mixtures of 1,4-butanediol, 1,5-pentanediol and 1,6-hexanediol. It is also possible to use polyester polyols derived from lactones, e.g. ε-caprolactone, or hydroxycarboxyic acids, e.g. ω-hydroxycaproic acid and hydroxybenzoic acids. Preference is given to using dipropylene glycol.

The hydroxyl number of the polyester alcohols is preferably in the range from 40 to 100 mg KOH/g.

Polymer-modified polyols, preferably polymer-modified polyesterols or polyetherols, particularly preferably graft polyetherols or graft polyesterols, in particular graft polyetherols, are also suitable as polyols. A polymer-modified polyol is a polymer polyol which usually has a content of preferably thermoplastic polymers of from 5 to 60% by weight, preferably from 10 to 55% by weight, particularly preferably from 30 to 55% by weight and in particular from 40 to 50% by weight.

Polymer polyols are described, for example, in EP-A-250 351, DE 111 394, U.S. Pat. Nos. 3,304,273, 3,383,351, 3,523,093, DE 1 152 536 and DE 1 152 537 and are usually prepared by free-radical polymerization of suitable olefinic monomers, for example styrene, acrylonitrile, (meth)acrylates, (meth)acrylic acid and/or acrylamide in a polyol, preferably polyesterol or polyetherol, serving as graft base. The side chains are generally formed by transfer of the free radicals of growing polymer chains onto polyols. The polymer polyol comprises, apart from the graft copolymers, predominantly the homopolymers of the olefins, dispersed in unchanged polyol.

In a preferred embodiment, acrylonitrile, styrene, in particular exclusively styrene, are/is used as monomers. The monomers are optionally polymerized in the presence of further monomers, a macromer, a moderator and using a free-radical initiator, usually azo or peroxide compounds, in a polyesterol or polyetherol as continuous phase.

If polymer polyol is comprised in the relatively high molecular weight compound b), it is preferably present together with further polyols, for example polyetherols, polyesterols or mixtures of polyetherols and polyesterols. Preference is given to using no polymer polyol.

The polymeric compounds having groups which are reactive toward isocyanate comprise from 60 to 80% by weight, preferably from 65 to 75% by weight, based on the total weight of the component (b), of at least one polyalkylene oxide (b1) having a hydroxyl number of from 20 to 60 mg KOH/g, preferably from 25 to 55 mg KOH/g and particularly preferably from 30 to 50 mg KOH/g, derived from one or more bifunctional to tetrafunctional starter molecules and a proportion of ethylene oxide units, based on the total weight of alkylene oxide units, of from 55 to 95% by weight, preferably from 60 to 90% by weight and in particular from 70 to 80% by weight, and from 20 to 30% by weight of at least one polyalkylene oxide (b2) having a hydroxyl number of from 20 to 80 mg KOH/g, preferably from 30 to 60 mg KOH/g, derived from one or more bifunctional to tetrafunctional starter molecules and a proportion of ethylene oxide units, based on the total weight of alkylene oxide units, of from 0 to 40% by weight, preferably from 2 to 40% by weight, particularly preferably from 3 to 30% by weight and in particular from 5 to 20% by weight. Here, the proportion of the compounds b1) and b2), based on the total weight of the polymeric compounds (b) having groups which are reactive toward isocyanates, is at least 80% by weight, preferably from 85 to 100% by weight and in particular 100% by weight.

Here, the polyalkylene oxide (b1) preferably has a proportion of primary OH groups of from 60 to 100%, particularly preferably from 70 to 90% and in particular from 70 to 80%, based on the total number of OH groups of the polyalkylene oxide b1), and the polyalkylene oxide b2) has a proportion of primary OH groups of from 30 to 0%, preferably from 20 to 0% and in particular 0%, based on the total number of OH groups of the polyalkylene oxide b2).

As chain extenders and/or crosslinkers (c), use is made of substances having a molecular weight of less than 500 g/mol, preferably from 60 to 400 g/mol, where chain extenders have 2 hydrogen atoms which are reactive toward isocyanates and crosslinkers have 3 hydrogen atoms which are reactive toward isocyanate. These can be used individually or in the form of mixtures. Preference is given to using diols and/or triols having molecular weights below 400, particularly preferably from 60 to 300 and in particular from 60 to 150. Possibilities are, for example, aliphatic, cycloaliphatic and/or araliphatic diols having from 2 to 14 carbon atoms, preferably from 2 to 10 carbon atoms, for example ethylene glycol, 1,3-propanediol, 1,10-decanediol, o-, m-, p-dihydroxycyclohexane, diethylene glycol, dipropylene glycol and preferably 1,4-butanediol, 1,6-hexanediol and bis(2-hydroxyethyl)hydroquinone, triols such as 1,2,4-, 1,3,5-trihydroxycyclohexane, glycerol and trimethylolpropane and low molecular weight hydroxyl-comprising polyalkylene oxides based on ethylene oxide and/or 1,2-propylene oxide and the abovementioned diols and/or triols as starter molecules. Particular preference is given to using monoethylene glycol, 1,4-butanediol and/or glycerol as chain extender (d).

If chain extenders, crosslinkers or mixtures thereof are employed, these are advantageously used in amounts of from 1 to 60% by weight, preferably from 1.5 to 50% by weight and in particular from 2 to 40% by weight, based on the weight of the components (b) and (d).

As catalysts (d) for producing the highly elastic polyurethane foams, preference is given to using compounds which strongly accelerate the reaction of the compounds comprising hydroxyl groups of the component (b) and optionally (d) with the polyisocyanate prepolymers (a). Mention may be made by way of example of amidines such as 2,3-dimethyl-3,4,5,6-tetrahydropyrimidine, tertiary amines such as triethylamine, tributylamine, dimethylbenzylamine, N-methylmorpholine, N-ethylmorpholine, N-cyclohexylmorpholine, N,N,N',N'-tetramethylethylenediamine, N,N,N',N'-tetramethylbutanediamine, N,N,N',N'-tetramethylhexanediamine, pentamethyldiethylenetriamine, bis(dimethylamino ethyl) ether, bis(dimethylaminopropyl)urea, dimethylpiperazine, 1,2-dimethylimidazole, 1-azabicyclo[3.3.0]octane and preferably 1,4-diazabicyclo[2.2.2]octane and alkanolamine compounds such as triethanolamine, triisopropanolamine, N-methyldiethanolamine and N-ethyldiethanolamine and dimethylethanolamine. Organic metal compounds, preferably organic tin compounds such as tin(II) salts of organic carboxylic acids, e.g. tin(II) acetate, tin(II) octoate, tin(II) ethylhexanoate and tin(II) laurate, and the dialkyltin(IV) salts of organic carboxylic acids, e.g. dibutyltin diacetate, dibutyltin dilaurate, dibutyltin maleate and dioctyltin diacetate, and also bismuth carboxylates such as bismuth(III) neodecanoate, bismuth 2-ethylhexanoate and bismuth octanoate or mixtures thereof are likewise possible. The organic metal compounds can be used either alone or preferably in combination with strongly basic amines. If the component (b) is an ester, preference is given to using exclusively amine catalysts.

Preference is given to using from 0.001 to 5% by weight, in particular from 0.05 to 2% by weight, of catalyst or catalyst combination, based on the weight of the component (b).

Furthermore, blowing agents (e) comprising water are present in the production of polyurethane foams. As blowing agents (e), it is possible to use further chemically acting blowing agents and/or physically acting compounds in addition to water. For the purposes of the present invention, chemical blowing agents are compounds which form gaseous products, for example water or formic acid, by reaction with isocyanate. Physical blowing agents are compounds which are dissolved or emulsified in the starting materials for polyurethane production and vaporize under the conditions of polyurethane formation. These are, for example, hydrocarbons, halogenated hydrocarbons and other compounds, for example perfluorinated alkanes such as perfluorohexane, chlorofluorocarbons and ethers, esters, ketones and/or acetals, for example (cyclo)aliphatic hydrocarbons having from 4 to 8 carbon atoms, fluorinated hydrocarbons such as Solkane® 365 mfc or gases such as carbon dioxide. In a preferred embodiment, a mixture of these blowing agents comprising water, particularly preferably exclusively water, is used as blowing agent.

The content of physical blowing agents (e) is, in a preferred embodiment, in the range from 1 to 20% by weight, in particular from 5 to 20% by weight, and the amount of water is preferably in the range from 0.5 to 10% by weight, in particular from 1 to 5% by weight.

As auxiliaries and/or additives (f), use is made of, for example, surface-active substances, foam stabilizers, cell regulators, external and internal mold release agents, fillers, pigments, hydrolysis inhibitors and also fungistatic and bacteriostatic substances.

Further information about the starting materials used may be found, for example, in the Kunststoffhandbuch, volume 7, Polyurethane, edited by Günter Oertel, Carl-Hanser-Verlag, Munich, $3^{rd}$ edition 1993, chapter 5, Polyurethanweichschaumstoffe.

In the industrial production of polyurethane foams, it is usual to combine the compounds having at least two active hydrogen atoms b) and one or more of the starting materials c) to f) to form a polyol component before reaction with the isocyanate prepolymer (a).

To produce the polyurethane foams of the invention, the polyisocyanate prepolymers are reacted with the polymeric compounds having groups which are reactive toward isocyanates in the presence of the abovementioned blowing agents, catalysts and auxiliaries and/or additives. The mixing ratios here are selected here so that the equivalence ratio of NCO groups of the polyisocyanates (a) to the sum of the reactive hydrogen atoms of the components (b) and optionally (c) and (f) is 0.5-1.25:1, preferably 0.55-1.05:1, more preferably 0.60-0.95:1 and particularly preferably 0.65-0.85:1. A ratio of 1:1 corresponds to an isocyanate index of 100.

The production of the polyurethane foams of the invention is preferably carried out by the one-shot process, for example with the aid of the high-pressure or low-pressure technique. The foams can be produced by continuous application of the reaction mixture to conveyor belts to produce slabstock foams or preferably in open or closed, for example metallic, molds.

It is particularly advantageous to work according to the two-component process in which, as indicated above, a polyol component is produced and foamed with polyisocyanate a). The components are preferably mixed at a temperature in the range from 15 to 120° C., preferably from 20 to 80° C., and introduced into the mold or applied to the conveyor belt. The temperature in the mold is usually in the range from 15 to 120° C., preferably from 30 to 80° C.

Amount of blowing agent and size of the mold are preferably selected so that the flexible polyurethane foam according to the invention has a density of from 20 to 70 g/l (particularly preferably from 30 to 60 g/l and in particular from 40 to 55 WI). Flexible polyurethane foams according to the invention are preferably made so that they have an indentation hardness of 40% compression, measured in accordance with DIN EN ISO 2439, method A, of less than 100N, particularly preferably less than 80N and in particular less than 70N. This can, for example, be effected via the degree of crosslinking which is influenced by the functionality of the components (a) and (b) or the content of crosslinkers. Furthermore, a relatively high proportion of chain extenders leads to harder foams. Measures for setting the hardness are known to those skilled in the art and are described, for example, in the Kunststoffhandbuch, volume 7, Polyurethane, edited by Günter Oertel, Carl-Hanser-Verlag, Munich, 3$^{rd}$ edition 1993, chapter 5, Polyurethanweichschaumstoffe.

The present invention further provides a flexible polyurethane foam obtainable by a process according to a process according to the invention.

A further problem associated with polyurethane foams is the occurrence of aromatic amines on their surface. The polyurethane foams of the invention surprisingly display not only a low stickiness but also a low extractable content of aromatic amines. This extractable content of aromatic amines is determined as described in the examples using a test specimen from the surface having dimensions of 3 cm×3 cm and a thickness of 0.5 cm in 50 ml acetic acid and is less than 3 ppm, preferably less than 2 ppm and in particular less than 1 ppm.

The subject matter of the invention is illustrated below with the aid of examples.

The examples were carried out using the following starting materials:

Polyol 1:
Glycerol-initiated polyoxypropylenepolyoxyethylene having a polyoxyethylene content, based on the content of alkylene oxide, of 73% by weight, a hydroxyl number of 42 and a proportion of primary hydroxyl groups of greater than 75%.

Polyol 2:
Glycerol-initiated polyoxypropylenepolyoxyethylene having a polyoxyethylene content, based on the content of alkylene oxide, of 10% by weight, a hydroxyl number of 48 and a proportion of primary hydroxyl groups of 5%.

Polyol 3:
Glycerol-initiated polyoxypropylenepolyoxyethylene having a polyoxyethylene content, based on the content of alkylene oxide, of 14% by weight, a hydroxyl number of 48 and a proportion of primary hydroxyl groups of greater than 80%.

Polyol 4:
Glycerol-initiated polyoxypropylene having a polyoxypropylene content, based on the content of alkylene oxide, of 100% by weight, a hydroxyl number of 42 glycerol-initiated polyoxypropylenpolyoxyethylene having a polyoxyethylene content, and a proportion of primary hydroxyl groups of 0%.

Iso 1 (Prepolymer):
54.5 parts by weight of 4,4'-MDI, 21.4 parts by weight of 2,4'-MDI and 24.1 parts by weight of higher homologues of MDI having more than two rings were reacted with 6.5 parts by weight of polyol 1 and 12.5 parts by weight of polyol 4 to give the isocyanate prepolymer. The NCO content was 25.6%

Iso 2
Mixture comprising 54.5 parts by weight of 4,4'-MDI, 21.4 parts by weight of 2,4'-MDI and 24.1 parts by weight of higher homologues of MDI having more than two rings. The NCO content was 32.8%

Iso 3
Mixture comprising 48 parts by weight of 4,4'-MDI, 40 parts by weight of 2,4'-MDI and 12 parts by weight of higher homologues of MDI having more than two rings. The NCO content was 33.2%

Iso 4 (Prepolymer):
46 parts by weight of 4,4'-MDI, 10 parts by weight of 2,4'-MDI and 25 parts by weight of higher homologues of MDI having more than two rings were reacted with 2.0 parts by weight of polyol 1 and 10.0 parts by weight of polyol 4 to give the isocyanate prepolymer. The NCO content was 28.3%

Catalyst I:
Amine catalyst Dabco® 33LV from Air Products

Catalyst II:
Amine catalyst Jeffcat ZF 10 from Huntsman

Stabilizer:
Dabco® DC198 from Air Products

The polyurethane foams here obtained by mixing 77.15 parts by weight of polyol 1, 16.0 parts by weight of polyol 2, 2.0 parts by weight of polyol 3, 1.5 parts by weight of stabilizer, 0.2 part by weight of catalyst I, 0.15 part by weight of catalyst II and 3.0 parts by weight of water to give a polyol component and mixing this with the isocyanate indicated in Table 1 to give a reaction mixture and curing the reaction mixture in a mold (40 cm×40 cm×10 cm) to give flexible polyurethane foam. The mechanical properties of the foams obtained are reported in Table 1:

TABLE 1

| Mechanical properties | | C 1 (Iso 2, index 70) | Example 1 (Iso 1, index 75) | Example 2 (Iso 1, index 70) | C 2 (Iso 2, index 70) | C 3 (Iso 3, index 70) |
|---|---|---|---|---|---|---|
| Indentation hardness 25% | [N] | — | 32 | — | 48 | 41 |
| Indentation hardness 40% | [N] | — | 44 | — | 65 | 56 |

TABLE 1-continued

| Mechanical properties | | C 1 (Iso 2, index 70) | Example 1 (Iso 1, index 75) | Example 2 (Iso 1, index 70) | C 2 (Iso 2, index 70) | C 3 (Iso 3, index 70) |
|---|---|---|---|---|---|---|
| Indentation hardness 65% | [N] | — | 79 | — | 114 | 101 |
| Compressive strength 25% | [kPa] | 0.7 | 0.7 | 1.0 | 1.1 | 0.9 |
| Compressive strength 40% | [kPa] | 0.9 | 0.8 | 1.2 | 1.3 | 1.1 |
| Compressive strength 65% | [kPa] | 1.7 | 1.6 | 2.3 | 2.5 | 2.2 |
| Hysteresis 70% | [%] | 13.9 | 14.3 | 12.5 | 12.1 | 13.0 |
| Core density | [g/l] | 49.1 | 49.8 | 49.6 | 51.8 | 47.2 |
| Compression set 50% | [%] | 1.3 | 1.4 | 1.3 | 2.1 | 2.0 |
| Compression set 75% | [%] | 1.4 | 2.2 | 1.9 | 2.6 | 2.7 |
| Compression set 90% | [%] | 1.8 | 2.3 | 2.4 | 3.3 | 3.5 |
| Tensile strength | [kPa] | 54 | 53 | 34 | 45 | 42 |
| Elongation at break | [%] | 185 | 186 | 124 | 123 | 139 |
| Tear propagation resistance | [N/mm] | 0.31 | 0.29 | 0.20 | 0.21 | 0.25 |
| Wet compression set (22 h/50° C./95% rel. atmospheric humidity/30% compression) | [%] | 0.9 | 1.1 | 0.9 | 0.9 | 0.4 |
| Stickiness | | strong | strong | no | no | no |
| | | | | | | strong collapse |
| MDA measurement surface | | | | | | collapse |
| 4,4'-MDA | | | <1 ppm | | <1 ppm | |
| 2,4'-MDA | | | <1 ppm | | 11 ppm | |
| MDA measurement* from the interior of the foam | | | | | | |
| 4,4'-MDA | | | <1 ppm | | <1 ppm | |
| 2,4'-MDA | | | <1 ppm | | <1 ppm | |

*Analysis of the samples for 2,4'- and 4,4'-MDA by extraction with acetic acid with the aid of HPLC (6 × 2 specimens of 3 × 3 × 0.5 cm for duplicate determination surface = in each case 3 × 3 × 3 cm cubes) in the interior of the foam Chromatographic Conditions for HPLC:
Software: Empower3 Version 7.00.00.00
Instruments: PM.-No.: E-LC-10, E-LC-13
Column: 235 (Nucleosil 100-5-C18 AB)
Eluent A: ACN: water (10:90) with 1.3 g of ammonium carbamate/l
Eluent B: ACN: water (90:10) with 0.2 g of ammonium carbamate/l
1 min. 90% eluent A 10% eluent B, up to 30 min. the change to 100% eluent B, up to 35 min
the change to 90% eluent A 10% eluent B
Wavelength: 240 nm
Analysis time: 40 min
Flow: 0.8 ml/min
Injection volume: 50 µl
The values were determined as follows:
Indentation hardness in accordance with DIN EN ISO 2369 at the compressions indicated in each case,
Compressive strength and hysteresis in accordance with DIN EN ISO 3386
Compression set in accordance with DIN EN ISO 1856

The content of 2,4'-MDA and 4,4'-MDA was determined on test specimens of the surface and from the interior of the foam by extraction with acetic acid and subsequent chromatographic determination by means of HPLC. For the determination on the surface, a 0.5 cm thick layer was cut off from the foam surface and test specimens of 3×3 cm were subsequently cut from this. For the determination from the interior of the foam, test specimens in the form of 3 cm×3 cm×3 cm cubes were cut from the middle of the foam.

The test specimens were stamped 20 times 4 times in 10 ml of acetic acid in each case in a conical flask. The acetic acid was combined and made up to 50 ml. The MDA content was subsequently determined chromatographically (HPLC) as described above. The content of 4,4'-MDA and 2,4'-MDA determined in this way is reported in Table 1. The chromatographic determination was carried out as follows:
Software: Empower3 Version 7.00.00.00
Instruments: PM.-No.: E-LC-10, E-LC-13
Column: 235 (Nucleosil 100-5-C18 AB)
Eluent A: ACN: water (10:90) with 1.3 g of ammonium carbamate/l
Eluent B: ACN: water (90:10) with 0.2 g of ammonium carbamate/l
1 min. 90% eluent A 10% eluent B, up to 30 min. the change to 100% eluent B, up to 35 min
the change to 90% eluent A 10% eluent B
Wavelength: 240 nm
Analysis time: 40 min
Flow: 0.8 ml/min
Injection volume: 50 µl The stickiness was measured on a molded polyurethane cushion as per the examples having the dimensions 40×40× 10 cm (L×W×H). Here, an aluminum plate having a diameter of 200 mm was pressed into the specimen up to application of a force of 4N and subsequently pulled out from the foam again at a speed of 15 mm/min. In the case of strong stickiness the foam adhered to the aluminum plate with a force of at least 10N 5 seconds after pulling back.

The invention claimed is:

1. A process for producing flexible polyurethane foams, in which
   a) polyisocyanate prepolymer, is mixed with
   b) polymeric compounds having groups reactive toward isocyanates,
   c) optionally chain extenders and/or crosslinkers,
   d) catalyst,
   e) blowing agent comprising water and
   f) optionally additives
to give a reaction mixture and reacted to give the flexible polyurethane foam, wherein the polyisocyanate prepolymer (a) has an NCO content of from 16 to 30% by weight, based on a total weight of the polyisocyanate prepolymer a), and is obtainable by reacting a1) diphenylmethane diisocyanate comprising:
   a1a) diphenylmethane 2,4'-diisocyanate,
   a1b) diphenylmethane 4,4'-diisocyanate and
   a1c) higher homologues of diphenylmethane diisocyanate having more than two rings with
a2) polyols comprising:
   a2a) ethylene-oxide-rich polyalkylene oxide having a hydroxyl number of from 20 to 60 mg KOH/g derived from one or more bifunctional to tetrafunctional starter molecules and a proportion of ethylene oxide units, based on a total weight of alkylene oxide units, of at least 55% by weight and
   a2b) low-ethylene oxide polyalkylene oxide having a hydroxyl number of from 20 to 60 mg KOH/g derived from one or more bifunctional to tetrafunctional starter molecules and a proportion of ethylene oxide units, based on the total weight of alkylene oxide units, of not more than 20% by weight and
where a proportion of a1a) diphenylmethane 2,4'-diisocyanate is from 5 to 15% by weight and that of a1b) diphenylmethane 4,4'-diisocyanate is from 40 to 80% by weight, based on a total weight of the diphenylmethane diisocyanate a1),
and the polymeric compounds (b) having groups which are reactive toward isocyanates comprise
   b1) from 60 to 80% by weight of at least one polyalkylene oxide having a hydroxyl number of from 20 to 60 mg KOH/g derived from one or more bifunctional to tetrafunctional starter molecules and a proportion of ethylene oxide units, based on a total weight of alkylene oxide units, of from 55 to 95% by weight,
   b2) from 20 to 30% by weight of at least one polyalkylene oxide having a hydroxyl number of from 20 to 80 mg KOH/g derived from one or more bifunctional to tetrafunctional starter molecules and a proportion of ethylene oxide units, based on a total weight of alkylene oxide units, of from 0 to 40% by weight
and
where a proportion of the compounds b1) and b2), based on a total weight of the polymeric compounds b) having groups which are reactive toward isocyanates, is at least 80% by weight.

2. The process according to claim 1, wherein the a1) diphenylmethane diisocyanate comprises
   from 5 to 15% by weight of a1a) diphenylmethane 2,4-diisocyanate,
   from 40 to 70% by weight of diphenylmethane 4,4'-diisocyanate and
   from 10 to 30% by weight of a1c) higher homologues of diphenylmethane diisocyanate having more than two rings, in each case based on the total weight of the diphenylmethane diisocyanate a1).

3. The process according to claim 1, wherein a proportion of a2a) ethylene oxide-rich polyalkylene oxide is from 4 to 8% by weight and a proportion of (a2b) low-ethylene oxide polyalkylene oxide is from 10 to 16% by weight, in each case based on the total weight of the polyisocyanate prepolymer a).

4. The process according to claim 1, wherein the polyalkylene oxide (a2a) has a proportion of primary OH groups of from 70 to 100%, based on a total number of OH groups of the polyalkylene oxide (a2b), and the polyalkylene oxide (a2) has a proportion of primary OH groups of from 30 to 0%, based on a total number of OH groups of the polyalkylene oxide a2).

5. The process according to claim 1, wherein the polyalkylene oxide b1) has a proportion of primary OH groups of from 70 to 100%, based on a total number of OH groups of the polyalkylene oxide b1), and the polyalkylene oxide b2) has a proportion of primary OH groups of from 30 to 0%, based on a total number of OH groups of the polyalkylene oxide b2).

6. The process according to claim 1, wherein the reaction of the reaction mixture to give the flexible polyurethane foam is carried out at an isocyanate index of from 55 to 105.

7. The process according to claim 1, wherein the flexible polyurethane foam is produced in a closed mold.

8. The process according to claim 1, wherein the flexible polyurethane foam has a density of from 20 to 70 g/l.

9. The process according to claim 1, wherein the flexible polyurethane foam has an indentation hardness at 40%.

10. A flexible polyurethane foam obtainable by a process according to claim 1.

11. The flexible polyurethane foam according to claim 10, wherein an extractable content of aromatic amines in a test specimen from a surface having dimensions of 3 cm×3 cm and a thickness of 0.5 cm in 50 ml of acetic acid is less than 1 ppm.

* * * * *